United States Patent
Mitsue et al.

(10) Patent No.: US 11,465,184 B2
(45) Date of Patent: Oct. 11, 2022

(54) CLEANING METHOD AND CLEANING APPARATUS

(71) Applicant: SUGINO MACHINE LIMITED, Uozu (JP)

(72) Inventors: Toyoaki Mitsue, Uozu (JP); Yoshiteru Kawamori, Itasca, IL (US); Toyohiro Yamauchi, Uozu (JP)

(73) Assignee: SUGINO MACHINE LIMITED

( * ) Notice: Subject to any disclaimer, the term of this patent is extended or adjusted under 35 U.S.C. 154(b) by 0 days.

(21) Appl. No.: 17/345,414

(22) Filed: Jun. 11, 2021

(65) Prior Publication Data
US 2022/0008960 A1    Jan. 13, 2022

(30) Foreign Application Priority Data
Jul. 8, 2020    (JP) .............................. JP2020-117727

(51) Int. Cl.
*B08B 3/02*    (2006.01)
*G05B 19/402*    (2006.01)

(52) U.S. Cl.
CPC ............ *B08B 3/024* (2013.01); *G05B 19/402* (2013.01); *B08B 2203/027* (2013.01)

(58) Field of Classification Search
CPC ... B08B 3/024; B08B 2203/027; B08B 9/021; G05B 19/402; B05B 1/1654
See application file for complete search history.

(56) References Cited

U.S. PATENT DOCUMENTS

| | | | | |
|---|---|---|---|---|
| 4,572,218 | A | * | 2/1986 | Hine ........................ A24B 3/04 131/303 |
| 2004/0016821 | A1 | * | 1/2004 | Reverberi ............... F04B 49/06 239/146 |
| 2018/0043403 | A1 | * | 2/2018 | Zippel ...................... B08B 3/10 |

FOREIGN PATENT DOCUMENTS

| | | |
|---|---|---|
| JP | H08-224552 A | 9/1996 |
| JP | 2002-280348 A | 9/2002 |
| JP | 2005-098329 A | 4/2005 |
| JP | 2009-061389 A | 3/2009 |
| JP | 6285880 B2 | 2/2018 |

OTHER PUBLICATIONS

Office Action dated Oct. 6, 2020 in a corresponding Japanese Patent Application No. 2020-117727.

* cited by examiner

*Primary Examiner* — Erin F Bergner
(74) *Attorney, Agent, or Firm* — United IP Counselors, LLC

(57) ABSTRACT

Provided is a cleaning method of reducing the power consumption. The cleaning method including: generating a jet of a cleaning liquid from a nozzle; moving the nozzle so that the jet collides with a target portion of a workpiece; acquiring a current position of the nozzle; determining whether the current position is within a target region corresponding to the target portion; ejecting the jet having an ejection pressure of a first pressure when the current position is within the target region; and ejecting the jet having the ejection pressure lower than the first pressure when the current position is other than the target region.

17 Claims, 6 Drawing Sheets

CLEANING METHOD AND CLEANING APPARATUS

CROSS-REFERENCE TO RELATED APPLICATIONS

This application claims the benefit of priority to Japanese Patent Application No. 2020-117727, filed on Jul. 8, 2020, the entire contents of which are hereby incorporated by reference.

BACKGROUND

1. Technical Field

The present invention relates to a cleaning method and a cleaning apparatus.

2. Description of the Background

A conventionally known pump apparatus ejects jet from a selected one of a plurality of nozzles (See Japanese Patent No. 6,285,880). The pump apparatus includes a positive displacement pump, a variable rotation speed driving device, a selection device, a discharge pipe, a nozzle, a control unit for controlling the rotation speed of the driving device, a storage device for storing a control parameter and a target value of the discharge pressure corresponding to each of the nozzles, and a pressure sensor. The control unit controls the rotation speed of the driving device by performing of feed back the discharge pressure so that the discharge pressure matches the target value using the control parameters corresponding to the selected nozzle.

BRIEF SUMMARY

The conventional pump apparatus consumes a large amount of power. An object of the present invention is to reduce power consumption of a cleaning apparatus.

A first aspect of the present invention provides a cleaning method, including:
  generating a jet of a cleaning liquid from a nozzle using a positive displacement pump;
  moving the nozzle so that the jet collides with a plurality of target portions of a workpiece;
  acquiring a current position of the nozzle;
  acquiring, based on the current position, a remaining moving amount to a target position;
  determining whether the current position is within a target region corresponding to the target portion;
  ejecting the jet having an ejection pressure of a first pressure when the current position is within the target region;
  ejecting the jet having the ejection pressure of a second pressure that is lower than the first pressure when the current position is other than the target region, the second pressure being the ejection pressure configured to reach the first pressure within a predetermined period during which the nozzle moves between the two of the target portions among the plurality of the target portions;
  increasing the ejection pressure toward the first pressure when the remaining moving amount is within a first range from the target position; and
  lowering the ejection pressure toward the second pressure when the remaining moving amount is out of the first range.

A second aspect of the present invention provides a cleaning apparatus, including:
  a nozzle configured to eject a jet of a cleaning liquid;
  a moving device configured to relatively move the nozzle to a plurality of target portions of a workpiece;
  a positive displacement pump connected to the nozzle, the positive displacement pump configured to change a rotation speed;
  a pressure gauge configured to measure an ejection pressure of the positive displacement pump;
  a control device including
    a storage device configured to store
      a numerical control program,
      a first pressure,
      a second pressure lower than the first pressure, the second pressure being the ejection pressure configured to reach to the first pressure within a predetermined period during which the nozzle moves between the two of the target portions among the plurality of the target portions, and
      a first range,
    a numerical control unit configured to control the moving device based on the numerical control program,
    a pressurizing unit configured to set a target pressure to the first pressure when a remaining moving amount to a target position that is acquired based on a current position is within the first range, and configured to set the target pressure to the second pressure otherwise, and
    a feedback control unit configured to perform a feedback control of the rotation speed so that the difference between an ejection pressure of the nozzle and the target pressure becomes zero.

The cleaning method includes deburring using a jet. The cleaning apparatus includes, for example, a deburring apparatus using a jet.

The nozzle ejects a cleaning liquid so that the jet collides with the workpiece. The nozzles are, for example, a straight jet spray nozzle, a flat spray nozzle, and a lance nozzle. In particular, the nozzle is numerically controlled so that the jet directly collides with a cleaning target portion. The nozzle repeatedly moves toward the target position apart by a nozzle offset distance from the target portion. Here, the target portion is, for example, a female screw, a hole, a milling surface, a milling edge, an intersecting hole, an oil hole, or a water hole. For example, the contour of the milling edge or the position of the burr around the intersecting hole is entirely the target position. The trajectory of the nozzle along the edge position or the burr position is entirely the target position. The area near the target position is referred to as a target region. The size of the target region may be determined corresponding to a characteristic length of the target portion. The target region is a region highly correlated with the cleaning of the target portion. For example, it is set as a region where the jet reaches the target portion or a region where the jet completely enters inside the target portion. The target region may be set according to the nozzle type or the ejection pressure.

The cleaning liquid is, for example, an aqueous cleaning liquid or an aqueous coolant. The cleaning liquid is an aqueous solution in which, for example, a rust inhibitor, a caustic alkali, or a preservative is dissolved.

The positive displacement pump is, for example, a piston pump. The positive displacement pump is preferably driven by a PM synchronous motor.

In the case of the positive displacement pump, theoretically, the rotation speed of the pump is proportional to the square root of the pressure. The positive displacement pump is capable of converting the measured pressure to the rotation speed. For example, the pressure of the pump is controlled so that the difference between the theoretical rotation speed calculated from the measured pressure and the target rotation speed calculated from the target pressure becomes zero.

Preferably, the first range is provided as a spherical range in three-dimensional space. The first range may be a polyhedron. The first range may be provided by, for example, a rectangular parallelepiped having sides in the XYZ direction. When the first range is given as a rectangular parallelepiped, the width in each axial direction may be determined by the acceleration (or time constant) of each axis of the moving device and the acceleration (or time constant) of the pressure.

When comparing the current position with the first range, for example, the first range is given as the coordinate origin at the target position. In this case, the first range may be given as the range having a distance from the target position (e.g., a range of 20 mm from the target position), or a certain range from the coordinates of the target position (e.g.,−35 mm to +35 mm in the X direction, −35 mm to +35 mm in the Y direction, −30 mm to +30 mm in the Z direction from the target position). The first range is calculated for each moving command.

Preferably, the second range is provided as a spherical range in three-dimensional space. The second range may be a polyhedron. The second range may be provided by, for example, a rectangular parallelepiped having sides in the XYZ direction. The second range is given as a typical range in which the pressure is to be maintained.

The width of the second range may be zero. In this case, when the movement is started from the target position, the target pressure is set as the second pressure.

When comparing the current position with the second range, for example, the second range is given as the coordinate origin at the starting position. In this case, the second range may be given as the range having a distance from the target position (for example, a range of 3 mm from the target position) or a certain range from the coordinates of the target position (for example, −2 mm to +2 mm in the X direction, −2 mm to +2 mm in the Y direction, and −1 mm to +1 mm in the Z direction from the target position). The second range is calculated for each moving command.

When the current position or the remaining moving amount is already within the first range at the time of the start to move, the target pressure may be set to the first pressure.

The first range and the second range may be determined based on an acceleration (or time constant) of each axis, a response delay in the feedback control, or a typical size of the target portion. The response delay can be modeled, for example, in a first order delay and dead time system.

The interpolation movement is, for example, a linear interpolation movement, a circular interpolation movement, or a helical interpolation movement. In the interpolation movement, the nozzle moves along the specified trajectory at the specified speed. During interpolation movement, the path becomes the target position (target path).

The movement other than the interpolation movement is, for example, a rapid traverse. In the rapid traverse, the nozzle moves from the starting position to the target position so as to arrive fastest. For movements other than interpolation movements, the path is not the target position.

The moving device is, for example, a moving device including a fixed column and a movable table, a moving device including movable three-axis columns, a vertically articulated robot, or a parallel link robot.

The numerical control program is, for example, a G-code program or a robot language program.

Preferably, the first pressure is input by the numerical control program. For example, the first pressure may be embedded as a macro variable in a G-code program. When the numeric control unit reads the macro variable, the value is stored in the storage device.

The first pressure may be determined for each nozzle, and the value may be stored in the storage device.

Preferably, the second pressure is a pressure that can reach the first pressure in a short time. Here, the short time is shorter than a time required for the nozzle to move between any two cleaning portions, for example, when the workpiece includes a plurality of cleaning portions.

For example, a function that defines the second pressure is stored in the storage device.

The second pressure may be a discharge pressure when the pump rotates at idling rotation speed.

The function for calculating the second pressure may use the moved distance as an argument, or use the acceleration of the moving device and the acceleration of the pressure as an argument. The second pressure may be calculated in parallel with the numerical control of the moving device.

The second pressure may be input by the numerical control program. For example, the second pressure is embedded as the macro variable in the G-code program. When the numeric control unit reads the macro variable, the value is stored in the storage device. The second pressure may be stored as a preset pressure. A plurality of the second pressures may be set, and the numerical control program may indicate which values to use.

The ejection stop command may lower ejection pressure toward the third pressure that is lower than the second pressure.

For example, the third pressure is 0 MPa, or an idling pressure obtained when the pump is idle operation. For example, the ejection pressure is lowered to the third pressure when the nozzle greatly retracts and the jet does not collide with the workpiece.

The cleaning apparatus may include a depressurizing unit. Preferably, the ejection stop command causes the depressurizing unit to stop the feedback control. Preferably, in response to the ejection stop command, the depressurizing unit rotates the pump at a rotation speed corresponding to the predetermined pressure (third pressure). The rotation speed of the pump during the ejection stops may be the idling rotation speed. The rotation speed of the pump during the ejection stops may be zero. The depressurizing unit may operate the pump at the idling pressure.

When increasing the ejection pressure and the ejection pressure is equal to or higher than the first threshold value, the ejection pressure may be performed by PID control. When the ejection pressure exceeds the first threshold value, the ejection pressure may be performed by PID control.

When lowering the ejection pressure and the ejection pressure is equal to or lower than the second threshold value, the ejection pressure may be performed by PID control. When the ejection pressure is lower than the second threshold value, the ejection pressure may be performed by PID control.

The ejection start command and the ejection stop command are embedded into the numerical control program. In the G-code program, the ejection start command and the ejection stop command are defined, for example, as M codes.

According to the present invention, the power consumption of the cleaning apparatus is reduced.

DETAILED DESCRIPTION

Figure 1:
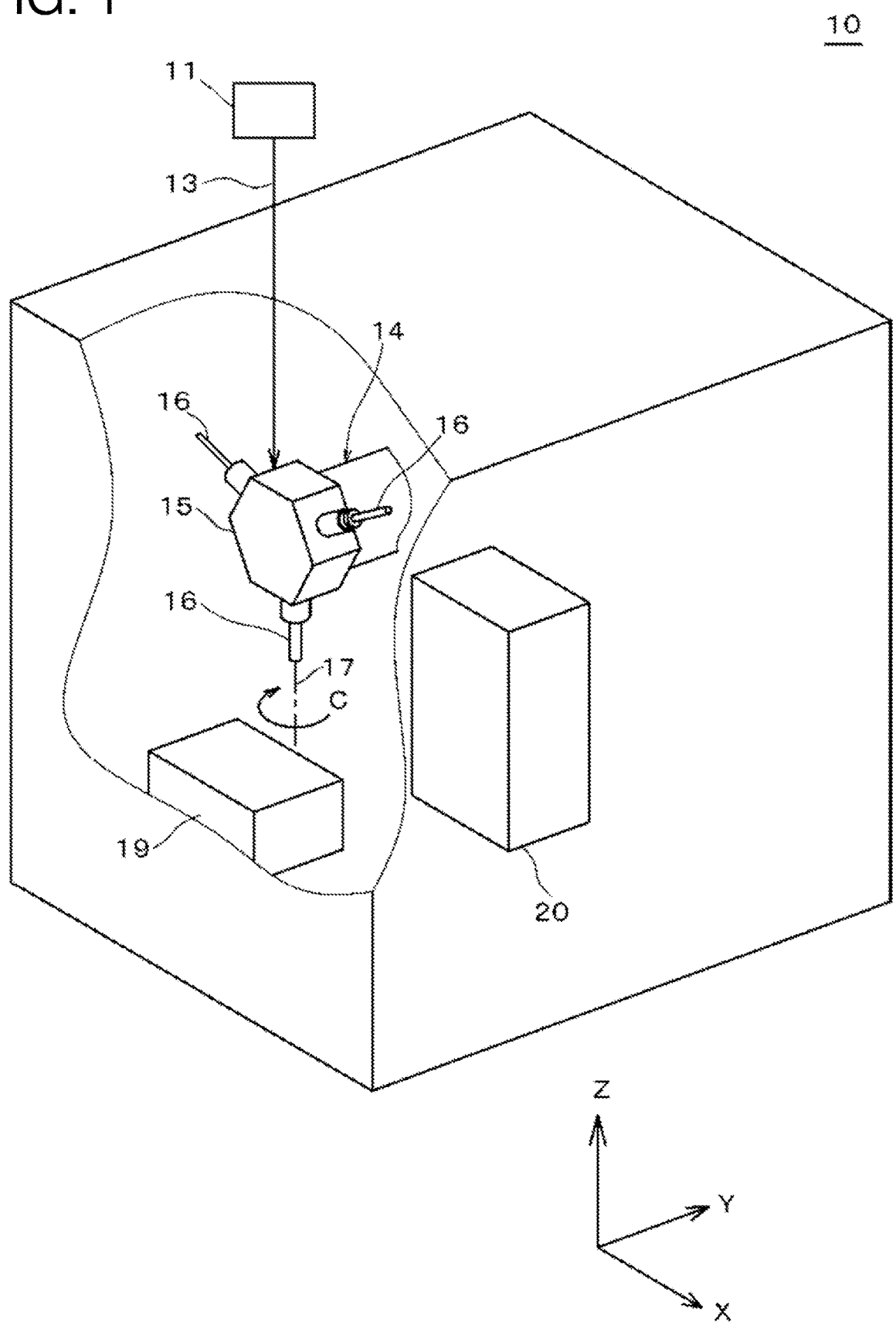
FIG. 1 is a perspective view of a cleaning apparatus according to an embodiment with a part of the cleaning apparatus cutout.

As shown in FIG. 1, a cleaning apparatus 10 includes a pump 11, a moving device 14, a turret 15, a nozzle 16, and a control device 20. The cleaning apparatus 10 cleans a workpiece 19.

The pump 11 is, for example, a piston pump. The pump 11 is driven by a PM synchronous motor. The pump 11 draws up a cleaning liquid from the tank (not shown) to supply it to the nozzle 16.

The moving device 14 is, for example, a column traverse moving device. The moving device 14 includes the turret 15 at its distal end. The plurality of nozzles 16 may be installed on the turret 15. The turret 15 selects one nozzle 16 to be ejected among the plurality of nozzles 16, and rotate it to direct downward. Preferably, the downwardly directed nozzle 16 is rotatable about a rotation axis 17 extending in a vertical direction. The downwardly directed nozzle 16 is connected to the pump 11 to eject the cleaning liquid. For example, the moving device 14 freely moves the nozzle 16 in a lateral direction, a vertical direction, and a longitudinal direction.

Figure 2:
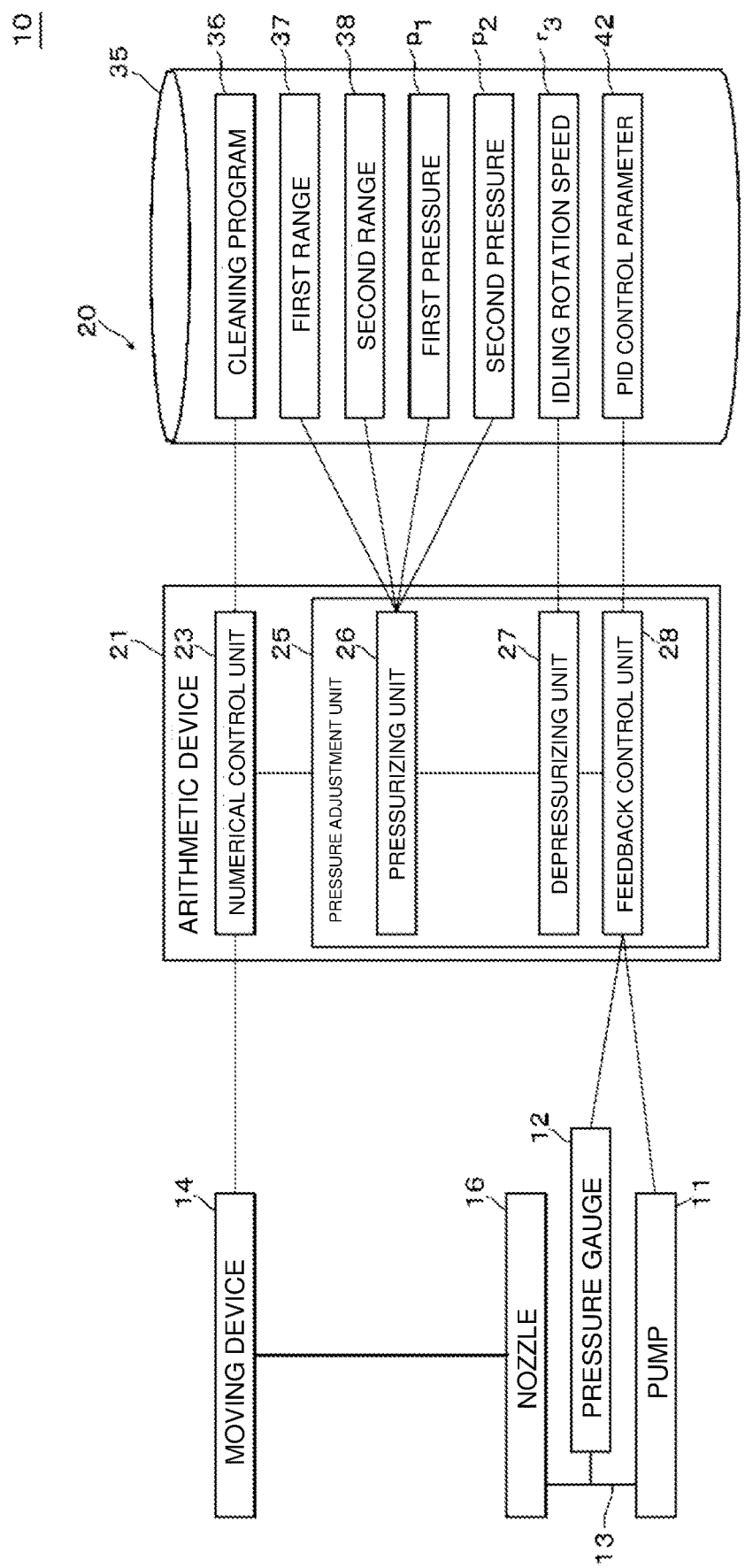
FIG. 2 is a block diagram showing the cleaning apparatus of the embodiment.

As shown in FIG. 2, the control device 20 is, for example, a numerical control device programmed with G code. The control device 20 includes a storage device 35, and an arithmetic device 21.

The storage device 35 is, for example, a non-volatile memory. The storage device 35 stores a cleaning program 36, a first range 37, a second range 38, a first pressure p1, a second pressure p2, and PID control parameters 42. The storage device 35 may store a first threshold value (not shown), a second threshold (not shown), and an idling rotation speed r3. The first pressure p1 is higher than the second pressure p2. The second pressure p2 may be a pressure corresponding to the idling rotation speed of the pump 11.

The first threshold value is in the vicinity of the first pressure p1, and is less than the first pressure p1. The second threshold value is in the vicinity of the second pressure p2, and is higher than the second pressure p2.

The idling rotation speed r3 may be 0 $min^{-1}$.

The cleaning program 36, which is a G-code program, includes a designation of the first pressure p1 as a macro variable. For example, M code includes the following code.

M21: Ejection start command
M22: Ejection stop command
M30: End of Block (End of Program)

The arithmetic device 21 includes a numerical control unit 23, and a pressure adjustment unit 25.

The arithmetic device 21 has a main memory. The numerical control unit 23 controls the moving device 14 based on the cleaning program 36 to move the nozzle 16. The numerical control unit 23 reads the current position from the moving device 14, and calculates a remaining moving amount from the current position to the target position, and the moved amount from the movement start position to the current position. The remaining moving amount and the moved amount are stored in the main memory.

Upon reading the ejection start command M21, the arithmetic device 21 stores in the main memory that the ejection is in progress. For example, the arithmetic device 21 substitutes "1" for an ejection parameter which is a binary variable. Upon reading the ejection stop command M22, the arithmetic device 21 deletes the memory that the ejection is in progress. For example, the arithmetic device 21 substitutes "0" for the ejection parameter. Upon reading the end of block M30, the arithmetic device 21 stops the program operation.

The pressure adjustment unit 25 includes a pressurizing unit 26, a depressurizing unit 27, and a feedback control unit 28.

Upon reading the ejection start command M21, the pressurizing unit 26 rotates the pump 11. The pressurizing unit 26 reads the remaining moving amount and the first range 37 for comparing. The pressurizing unit 26 reads the moved amount and the second range 38 for comparing. The target pressure p0 is set as a result of the comparison.

Upon reading the ejection stop command M22, the depressurizing unit 27 rotates the pump 11 at the idling rotation speed r3. At this time, the depressurizing unit 27 may stop the pump 11. Preferably, the depressurizing unit 27 stops the feedback control.

Figure 3:
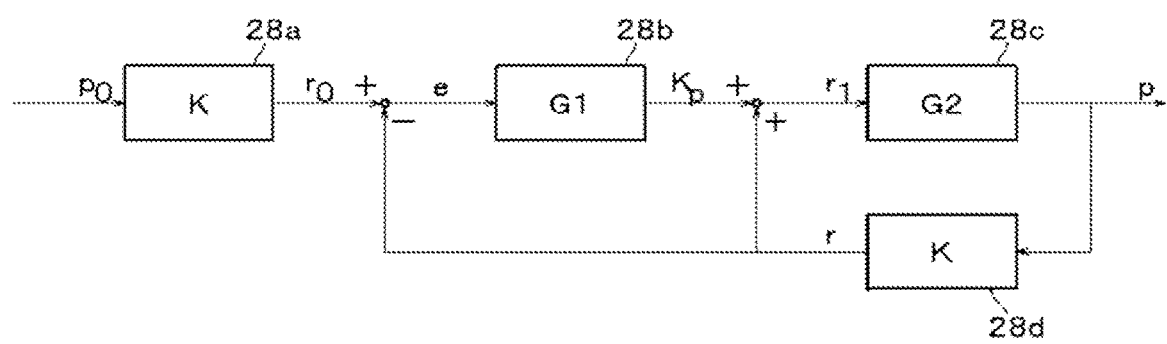
FIG. 3 is a block diagram showing the feedback control of the embodiment.

As shown in FIG. 3, the feedback control unit 28 includes a first rotation speed converting unit 28a, a PI control unit 28b, and a second rotation speed converting unit 28d. A control target 28c include the pump 11, the nozzle 16, the pipe 13, and a pressure gauge 12. The first rotation speed converting unit 28a and the second rotation speed converting unit 28d have the same structure. The transfer functions of the first and second rotation speed converting units 28a, 28d are given by a constant K, for example. The constant K is given, for example, as a function of the rotation speed and pressure of the pump 11. The transfer functions of the PI control unit 28b and the control target 28c are G1 and G2, respectively.

The first rotation speed converting unit 28a receives the target pressure p0, and output the target rotation speed r0. The PI control unit 28b receives a difference "e" between the target rotation speed r0 and the rotation speed r, and outputs an operation amount Kp. The sum of the operation amount Kp and the rotation speed r is input to the pump 11 as a rotation speed command value r1. The pump 11 is rotated according to the rotation speed command value r1. The nozzle 16 ejects the cleaning liquid. The pressure gauge 12 measures and outputs an ejection pressure p in the pipe 13. The second rotation speed converting unit 28d receives the ejection pressure p, and outputs the rotation speed r for feeds back.

When the ejection pressure p rises toward the first pressure p1, the feedback control unit 28 performs a proportional control of the ejection pressure p when the ejection pressure p is equal to or lower than the first threshold value. When the ejection pressure p exceeds the first threshold value, the feedback control unit 28 performs PI control of the ejection pressure p.

When the ejection pressure p decreases toward the second pressure p2, the feedback control unit 28 performs a proportional control of the pressure p when the ejection pressure p is equal to or higher than the second threshold value. When the ejection pressure p is lower than the second threshold value, the feedback control unit 28 performs PI control of the ejection pressure p.

The cleaning method will now be described with reference to FIGS. 4 to 6.

Figure 4:
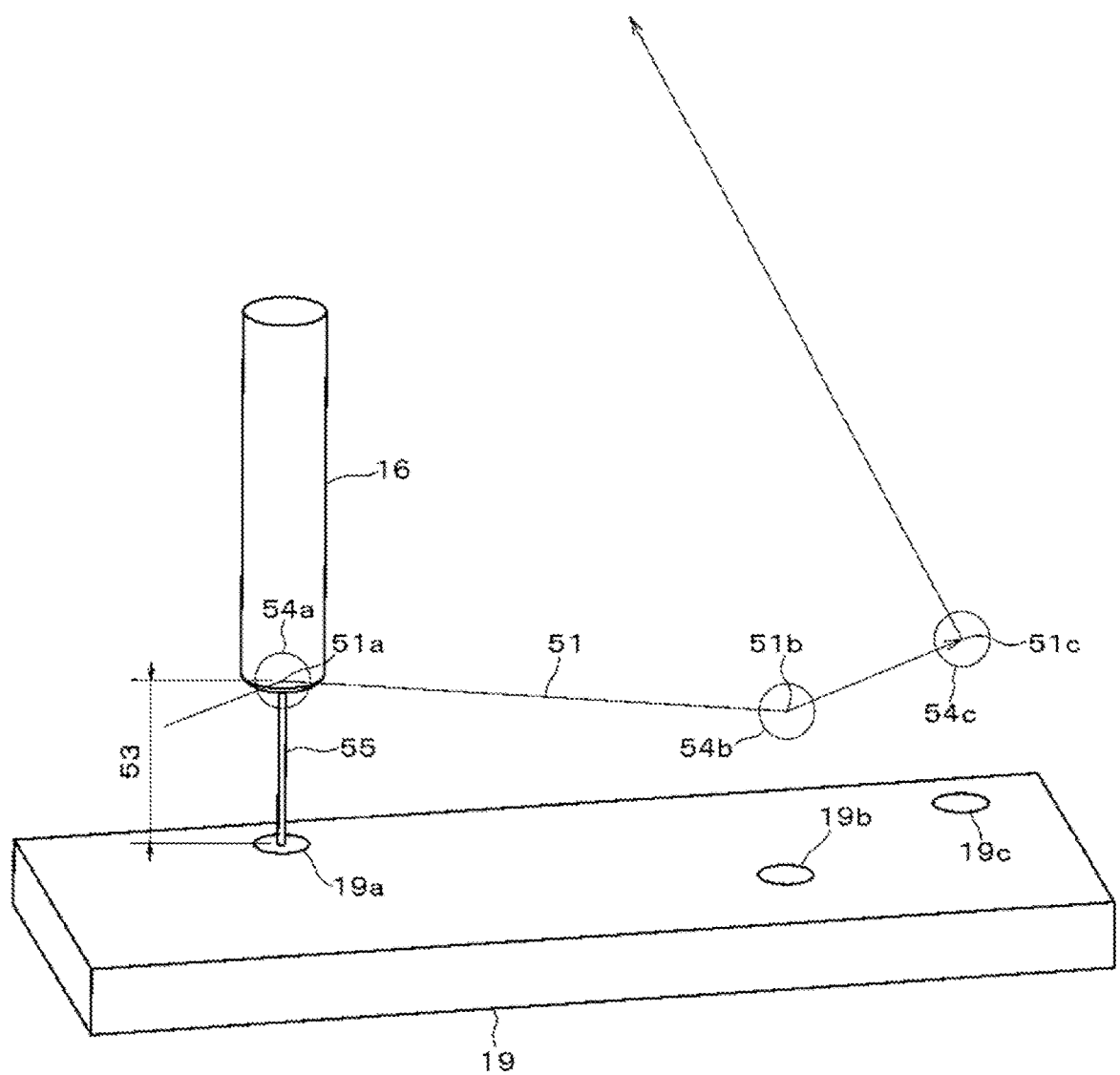
FIG. 4 is a perspective view showing a cleaning state of the embodiment.

As shown in FIG. 4, the workpiece 19 has the target portions 19a, 19b, and 19c. The target portions 19a, 19b, and 19c are, for example, female screws. Note that the workpiece 19 may have any number of the target portions.

The numerical control unit 23 numerically controls the moving device 14 to move the nozzle 16 so that a jet 55 collides with the target portions 19a, 19b, and 19c. The nozzle 16, which is located at a position apart a nozzle offset distance 53 from an opening of the target portions 19a, 19b, and 19c one after another, moves along a trajectory 51 defined by the cleaning program 36. The jet 55 collides perpendicularly with the openings of the target portions 19a, 19b, and 19c to clean the target portions 19a, 19b, and 19c.

The positions of the nozzle 16 when the target portions 19a, 19b, and 19c are cleaned are set as target positions 51a, 51b, and 51c, respectively. Regions in the vicinity of the target positions 51a, 51b, and 51c are referred to as target regions 54a, 54b, and 54c, respectively. The target regions 54a, 54b, and 54c are defined by the size of the target portions 19a, 19b, and 19c. For example, when the target portions 19a, 19b, and 19c are M6 female threads, the target regions 54a, 54b, and 54c are closed regions that are spheres having a diameter of 6 mm having a center at the target positions 51a, 51b, and 51c. When the nozzle 16 is located in the target region 54a, 54b, and 54c by moving the nozzle 16, the ejection pressure p of the jet 55 is increased. The ejection pressure p is lowered at the middle position thereof.

Figure 5:
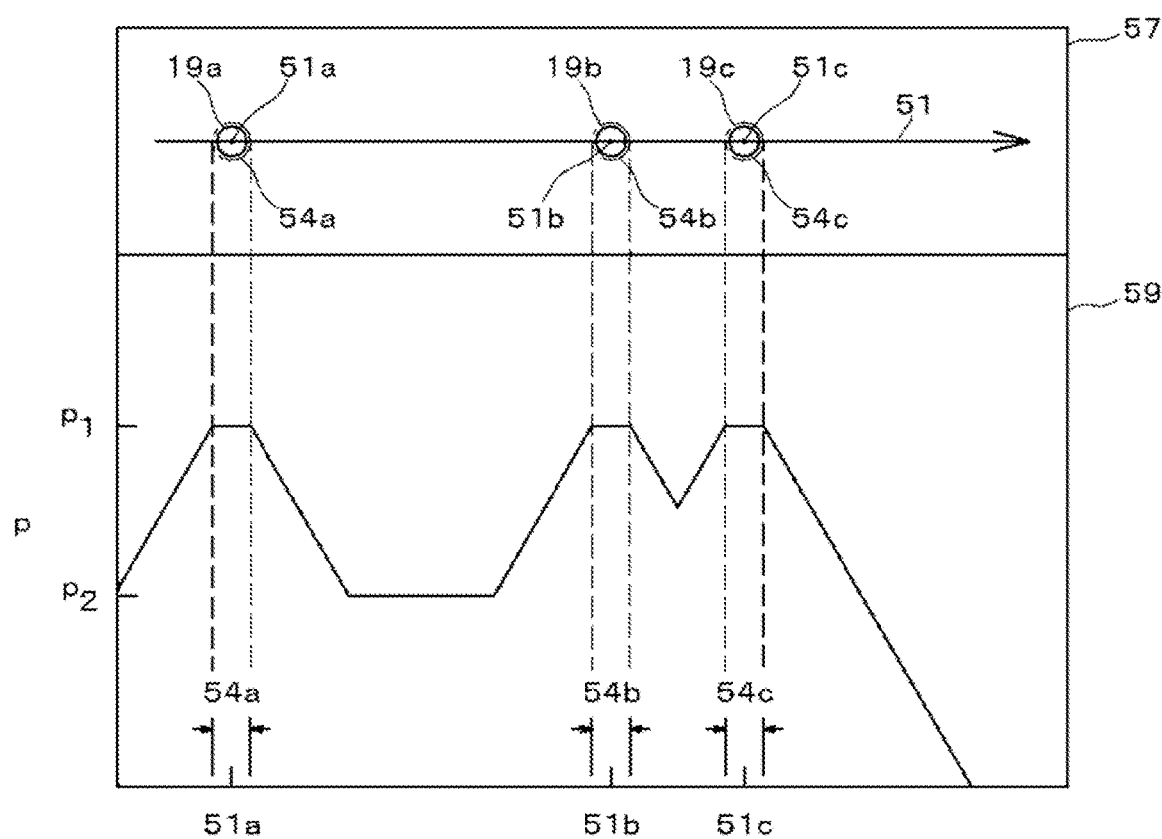
FIG. 5 is a graph showing an ejection pressure for a moving distance along a trajectory and a cleaning target portion during the cleaning in FIG. 4.

FIG. 5 shows a graph 59 of the pressure with respect to the moving distance along the trajectory 51, and a plan view 57 of the workpiece 19 corresponding to the graph 59. In the plan view 57, the trajectory 51 is shown in a straight line. As shown in FIG. 5, the ejection pressure p varies momentarily depending on the position of the nozzle 16.

When the nozzle 16 is located within the target region 54a, the ejection pressure p becomes the first pressure p1. At this time, the jet 55 directly collides with the target portion 19a. When the nozzle 16 leaves the target region 54a, the ejection pressure p becomes lower than the first pressure p1. As the nozzle 16 approaches to the target region 54b, the ejection pressure p rises towards the first pressure p1. When the nozzle 16 is positioned within the target region 54b, the ejection pressure p becomes the first pressure p1. Thereafter, the ejection pressure p similarly fluctuates according to the position of the nozzle 16. As a result, when the jet 55 collides with the target portions 19a, 19b, and 19c, the ejection pressure p becomes the first pressure p1 to properly clean the target portions 19a, 19b, and 19c.

Specifically, while the numerical control unit 23 moves the nozzle 16, the pressure adjustment unit 25 controls the control target 28c in the background, based on the moved amount and the remaining moving amount calculated by the numerical control unit 23.

The numerical control unit 23 reads and executes the cleaning program 36 by each block. While the numerical control unit 23 executes the cleaning program 36, the pressurizing unit 26 always processes the operation shown in FIG. 6, in the background processing. During ejection, the feedback control unit 28 performs feedback control of the ejection pressure p at all times with the target pressure p0 as a target.

Figure 6:
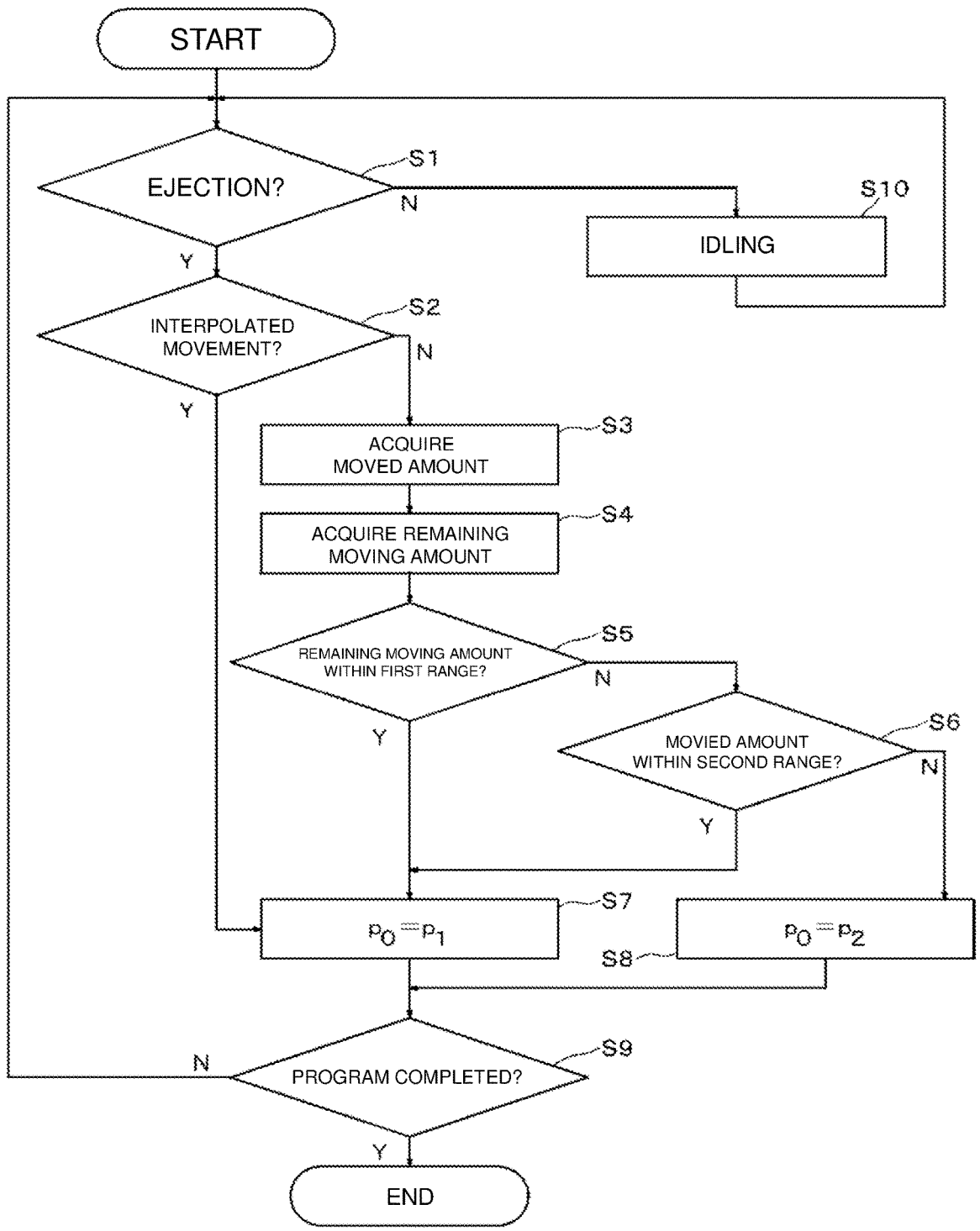
FIG. 6 is a flowchart showing the cleaning method of the embodiment.

As shown in FIG. 6, in step S1, the pressure adjustment unit 25 acquires a value of the ejection parameter to determine whether or not the ejection is in progress. If yes, the process proceeds to step S2. If no, the process proceeds to step S10.

In step S2, the pressure adjustment unit 25 determines whether the moving block executed by the numerical control unit 23 is an interpolated movement. For example, it is no if rapid traverse, and yes if linear interpolation movement or circular interpolation movement. If yes, the process proceeds to step S7. If no, the process proceeds to step S3.

In step S3, the pressurizing unit 26 acquires the moved amount.

In step S4, the pressurizing unit 26 acquires the remaining moving amount. Step S4 may be performed simultaneously with step S3.

In step S5, the pressurizing unit 26 determines whether or not the remaining moving amount is within the first range 37. If yes, the process proceeds to step S7. If no, the process proceeds to step S6.

In step S6, the pressurizing unit 26 determines whether or not the moved amount is within the second range 38. If yes, the process proceeds to step S7. If no, the process proceeds to step S8.

In step S7, the first pressure p1 is substituted into the target pressure p0.

In step S8, the second pressure p2 is substituted into the target pressure p0.

In step S10, preferably, the depressurizing unit 27 rotates the pump 11 at the idling rotation speed r3. At this time, the feedback control unit 28 stops.

In step S9, the pressure adjustment unit 25 determines whether or not the program is completed. If yes, the process ends. If no, the process returns to step S1.

According to the cleaning method of the present embodiment, the ejection pressure p is increased when the jet 55 collides with the target portions 19a, 19b, and 19c, while the ejection pressure p is lowered when the jet 55 collides with other portion of the workpiece 19. As the pump 11 is a positive displacement pump, the driving power is reduced when the ejection pressure p is lowered. Lowering the ejection pressure p during the jet 55 does not collide with the target portions 19a, 19b, 19c allows to reduce the power consumption of the pump 11.

The jet of the first pressure collides with the target portion, while the jet of the pressure lower than the first pressure collides with the other portions. Thus, the surface is suppressed from being damaged even when the surface of the workpiece is easily damaged by the jet.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

10 Cleaning apparatus
11 Pump (Positive displacement pump)
12 Pressure gauge
14 Moving device
16 Nozzle
19 Workpiece
19a, 19b, 19c Target portion
p Ejection pressure
p0 Target pressure
p1 First pressure
p2 Second pressure
r Rotation speed

What is claimed is:

1. A cleaning method, comprising:
generating a jet of a cleaning liquid from a nozzle using a positive displacement pump;
repeatedly performing determination including moving the nozzle so that the jet collides with each of a plurality of target portions of a workpiece, acquiring a remaining moving amount to a target position of the nozzle based on a current position of the nozzle, and determining whether the current position is within a target region corresponding to the each of the plurality of target portions and whether the remaining moving amount is within a first range from the target position of the nozzle;
ejecting the jet having an ejection pressure of a first pressure when the current position is within the target region in the determination;
ejecting the jet having the ejection pressure of a second pressure that is lower than the first pressure when the current position is other than the target region in the determination, the second pressure being the ejection pressure configured to reach the first pressure within a predetermined period during which the nozzle moves between the two of the target portions;
increasing the ejection pressure toward the first pressure when the remaining moving amount is within the first range from the target position in the determination; and
lowering the ejection pressure toward the second pressure when the remaining moving amount is out of the first range in the determination.

2. The cleaning method according to claim 1, further comprising:
acquiring, based on the current position, a moved amount of the nozzle from a start position; and
lowering the ejection pressure toward the second pressure when the remaining moving amount is out of the first range and the remaining moving amount is out of a second range from the start position.

3. The cleaning method according to claim 1, further comprising:
ejecting the jet at the first pressure from the nozzle when the nozzle moves along the target position at a constant speed.

4. The cleaning method according to claim 2, further comprising:
ejecting the jet at the first pressure from the nozzle when the nozzle moves along the target position at a constant speed.

5. The cleaning method according to claim 2, further comprising:
setting a target pressure to the first pressure when the remaining moving amount is within the first range, or when the remaining moving amount is out of the first range and the moved amount is within the second range,
otherwise, setting the target pressure to the second pressure;
wherein performing a feedback control of the ejection pressure so that a difference between the ejection pressure and the target pressure becomes zero.

6. The cleaning method according to claim 5, further comprising:
starting the feedback control in response to an ejection start command; and
stopping the feedback control in response to an ejection stop command to stop the rotation of the positive displacement pump or to set an idling rotation speed.

7. The cleaning method according to claim 6, further comprising
setting the target pressure to the first pressure while the nozzle moves along the target position at a constant speed.

8. The cleaning method according to claim 1, wherein
the second pressure is given by a function of the first pressure.

9. The cleaning method according to claim 1, wherein
when the ejection pressure increases toward the first pressure,
the ejection pressure is performed by proportional control when the ejection pressure is lower than a first threshold that is in the vicinity of the first pressure and lower than the first pressure, and
the ejection pressure is performed by PI control when the ejection pressure exceeds the first threshold.

10. The cleaning method according to claim 1, wherein
when the ejection pressure is lowered toward the second pressure,
the ejection pressure is performed by proportional control when the ejection pressure is equal to or higher than a second threshold that is in the vicinity of the second pressure and larger than the second pressure, and
the ejection pressure is performed by PI control when the ejection pressure is lower than the second threshold.

11. The cleaning method according to claim 4, further comprising:
setting a target pressure to the first pressure when the remaining moving amount is within the first range, or when the remaining moving amount is out of the first range and the moved amount is within the second range,
otherwise, setting the target pressure to the second pressure;
wherein performing a feedback control of the ejection pressure so that a difference between the ejection pressure and the target pressure becomes zero.

12. The cleaning method according to claim 2, wherein
the second pressure is given by a function of the first pressure.

13. The cleaning method according to claim 3, wherein
the second pressure is given by a function of the first pressure.

14. The cleaning method according to claim 4, wherein
the second pressure is given by a function of the first pressure.

15. The cleaning method according to claim 5, wherein
the second pressure is given by a function of the first pressure.

16. The cleaning method according to claim 6, wherein the second pressure is given by a function of the first pressure.

17. The cleaning method according to claim 7, wherein the second pressure is given by a function of the first pressure.

\* \* \* \* \*